Figure 1:
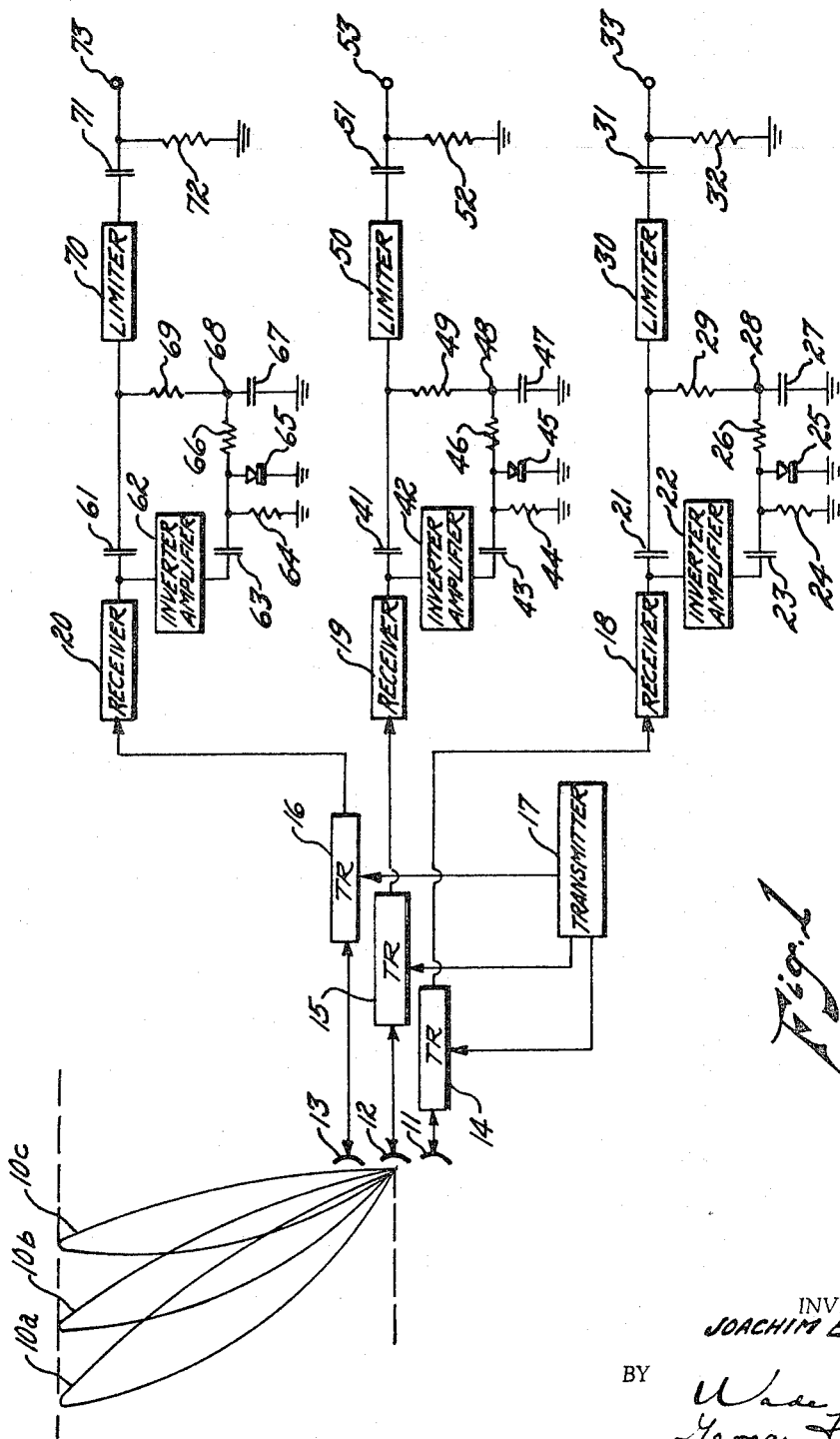

INVENTOR.
JOACHIM E. WOLF

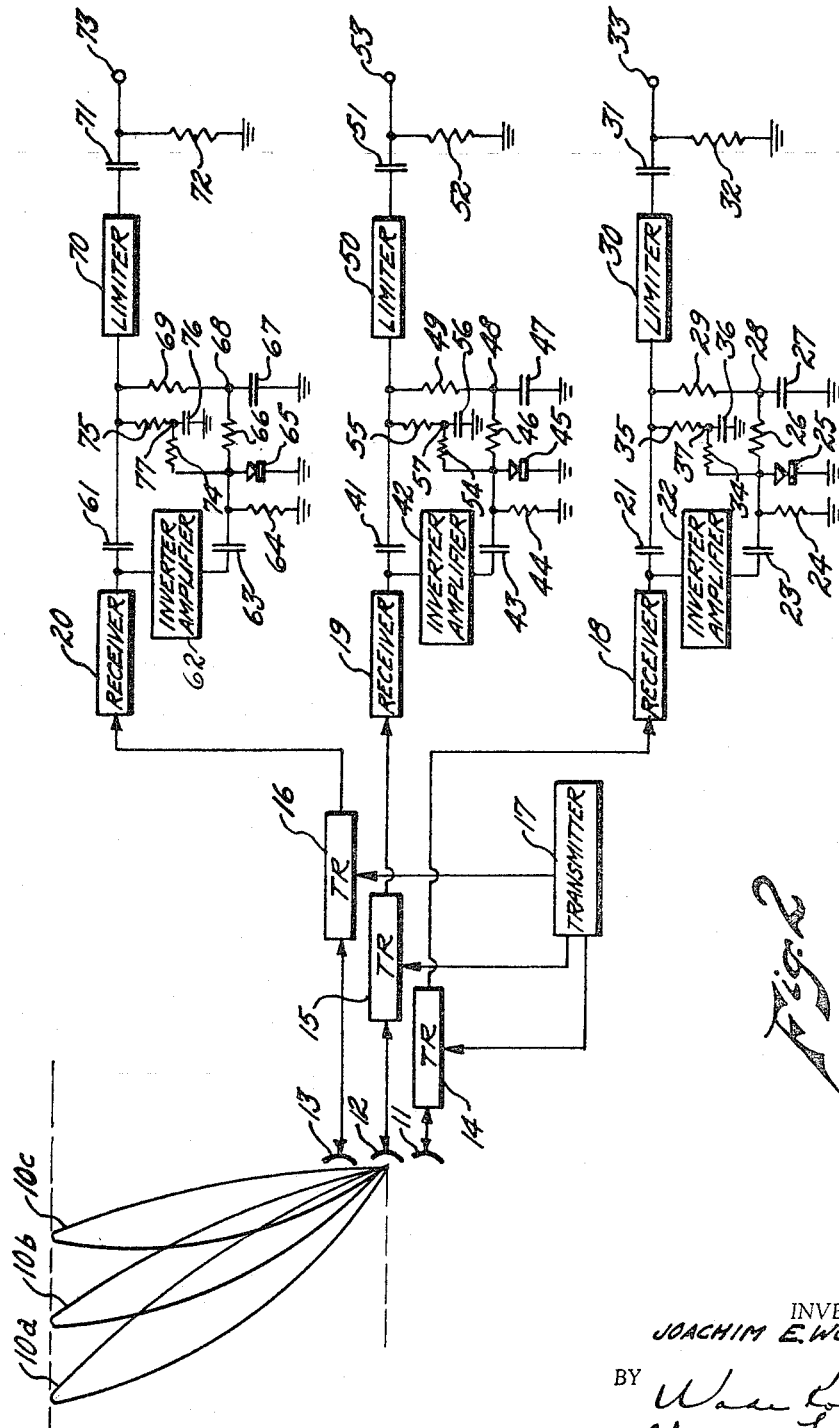

3,278,936
AUTOMATIC BEAM BLANKING FOR STACKED BEAM RADAR

Joachim E. Wolf, Linthicum Heights, Md., assignor, by mesne assignments, to the United States of America as represented by the Secretary of the Air Force
Filed Nov. 13, 1963, Ser. No. 323,516
2 Claims. (Cl. 343—18)

This invention relates to radar systems being jammed and more particularly to a stacked beam radar system in which automatic blanking is provided for each beam being jammed.

A very desirable feature of stacked beam radar is the possibility to blank jamming in individual beams without losing useful information in other beams. In present stacked beam radars the blanking of individual beam signals is performed by the A.J. (anti-jamming) operator through manual switching. This type of operation is unsatisfactory for several reasons:

The A.J. operator has to carry too big a workload. In addition to a large number of various A.J. controls beam blanking amounts to thirty or more individual switches (number of beams times types of A.J. videos), which have to be handled intelligently and according to continuously changing jamming conditions. This task appears even more difficult in view of the fact that the operator very probably will not have much chance to collect this type of experience before a surprise attack.

The reaction time of the operator is too long. He will need the time of probably more than one antenna revolution to get a fair idea of the jamming situation. If this situation changes faster, efficient beam blanking is impossible, resulting in loss of useful information. Beam blanking should also occur only during the time of actual jamming, this means probably for a limited azimuth angle only. The A.J. operator, however, would switch the channel off completely, thus causing loss of valuable information for the rest of the antenna revolution.

At present the A.J. operator has no way to select the right channels other than on a try-and-error basis. Loss of information will necessarily occur during this search for the jammed channel. In the case of two jammers at different elevation angles it will be practically impossible to choose the correct selection.

In accordance with the present invention, full advantage of the inherent A.J. properties of stacked beam radar is achieved by providing an automatic beam blanking system for each individual video channel associated with the stacked beam radar system.

An object of the present invention is to provide automatic beam blanking for a stacked beam radar system being jammed.

Another object of the present invention is to provide automatic beam blanking for a stacked beam radar system wherein each video channel associated with a beam is blanked in accordance with the magnitude of jammining occurring within said associated beam.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described embodiments of the invention.

In the drawings:
FIG. 1 shows one embodiment of the present invention partly in block and partly in schematic form; and
FIG. 2 shows another embodiment of the present invention partly in block and partly in schematic form.

Now referring in detail to FIG. 1, there is shown a highly simplified diagram of a stacked beam radar in which a plurality of radar beams 10a, 10b, and 10c is provided from common transmitter 17 by way of TR devices 14, 15, and 16 and antenna elements 11, 12, and 13, respectively. It is to be noted that all beams have a common azimuth angle, but each beam has a different elevation angle. The returning signals are received by way of antenna elements 11, 12, and 13 and are fed to receivers 18, 19, and 20 by way of TR (transmit-receive) devices 14, 15, and 16, respectively. Each of receivers 18, 19, and 20 provides a video output signal. Thus there is provided an individual receiver channel for each of stacked beams 10a, 10b, and 10c.

The output of receiver 18 is interconnected to limiter 30 by way of capacitor 21. The output of receiver 18 is also received by inverter-amplifier 22. The output of inverter-amplifier 22 is fed to diode 25 by way of capacitor 23. Resistor 24 is in shunt relationship with diode 25. The input of limiter 30 is connected to ground by way of resistor 29 and capacitor 27. Diode 25 is connected to point 28 by resistor 26. The output of limiter 30 is connected to terminal 33 by way of capacitor 31. Terminal 33 is also connected to ground by way of resistor 32. The identical circuitry at the output of receiver 18 consisting of above-described elements 21–33 is also utilized at the outputs of receiver 19 and 20 and consists of elements 41–53 and 61–73, respectively.

In the operation of the above-described system, only one channel is described as the other channels are identical thereto. The video signal output, as above-described, from receiver 18 is A.C. coupled through capacitor 21 to limiter 30. Component 30 is a conventional bottom limiter and is such as shown and described at pages 321, 619, and 620 of Terman's "Electronic and Radio Engineering" (4th Edition) published in 1955 by McGraw-Hill Book Company, Inc. When no jamming occurs, bottom limiter 30 does not affect the video signal because limiting occurs only for potentials more negative than the bottom of the video signal. The video signal is also fed through inverter-amplifier 22 to detector diode 25 which is followed by integrating circuit of resistor 26 and capacitor 27. The potential at point 28 provides the bias voltage for bottom limiter 30 input. When a jammer increases the average video amplitude, point 28 becomes more negative until bottom limiting occurs in limiter 30 thereby resulting in blanking of the output signal from bottom limiter 30. The output signal for the channel including receiver 18 is provided by way of terminal 33. A measure of the elevation angle of a target may be determined by comparing the relative received signals in each of the respectively associated receivers. Thus it is seen that when a jammer introduces a signal into the stacked-beam radar system, for example, by way of beam 10a, and the introduced jamming signal is of sufficient amplitude to be detrimental to the operation of the system, there will be an automatic blanking of only this channel as above-described and only for the periods wherein the jamming signal destroys the usefulness of the target signal in that channel. It is apparent that any of a multiplicity of channels may be automatically blanked in accordance with the jamming received by the beams associated with said channels.

Now referring to FIG. 2, the operation and circuitry thereof is identical to that shown in FIG. 1 but further including resistors 34, 35, and capacitor 36. Resistor 34 is connected to point 37 from diode 25. Resistor 35 is connected from the input of limiter 30 to point 37. Capacitor 36 is connected from point 37 to ground. Resistor 34 and capacitor 36 comprise a second integration circuit having a shorter time constant which is added to the blanking loop thereby speeding up the reaction time of the circuit. The original long time constant provided for resistor 26 and capacitor 27 provides sufficient integration over several radar repetition periods. The identical circuitry provided by resistors 34, 35, and capacitor 36 is also provided for the other channels and consists of resistors 54, 55, and capacitor 56 in one instance and by resistors 74, 75, and capacitor 76 in the other instance. It is to be noted that the aforementioned blanking loop is by way of inverter-amplifier 22, diode detector 25, integration circuit of resistor 26 and capacitor 27 back to the input of limiter 30.

What is claimed is:

1. In a multichannel stacked-beam radar, a system to automatically blank each of said channels in accordance with a jamming signal received thereby comprising means to transmit a radar signal from each of said stacked-beams, means to receive by way of a separate channel for each of said stacked beams target signals resulting from the transmission of radar signals by said transmitting means each of said separate channel including a receiver providing a video output signal therefrom, a bottom limiter and an inverter-amplifier receiving simultaneously said video output signal, a detector receiving the output signal of said inverter-amplifier, and an integrating network having an integration period extending over several radar repetition periods, said integration network receiving the output signal from said detector for further application to the input of said bottom limiter, thereby providing a biasing voltage thereto, said biasing voltage having a magnitude in accordance with said jamming signal.

2. In a multichannel stacked-beam radar, a system to automatically blank each of said channels in accordance with a jamming signal received thereby comprising means to transmit radar signals from each of said stacked-beams, means to receive by way of a separate channel for each of said beams target signals resulting from the transmission of radar signals by said transmitting means, each of said separate channels including a receiver providing a video output signal therefrom, a bottom limiter and an inverter-amplifier simultaneously receiving said video output signal, a first integration network having an integration period extending over several radar repetition periods, said first integration network receiving the output signal from said inverter-amplifier by way of a detector for application to the input of said bottom limiter to provide a biasing voltage thereto, said biasing voltage having a magnitude in accordance with magnitude of said jamming signal, and a second integration network having an integration period shorter than said first integration network, said second integration network being connected to said detector for decreasing the reaction time of said first integration network.

References Cited by the Examiner
UNITED STATES PATENTS

| | | | |
|---|---|---|---|
| 2,859,437 | 11/1958 | Atlas | 343—11 |
| 2,901,601 | 8/1959 | Richardson et al. | 325—474 |
| 3,011,053 | 11/1961 | Sev | 343—18 X |
| 3,034,117 | 5/1962 | Tower et al. | 343—11 |
| 3,049,702 | 8/1962 | Schreitmueller | 343—11 X |
| 3,140,445 | 7/1964 | Myers et al. | 325—474 X |
| 3,160,816 | 12/1964 | Cunningham et al. | 343—11 X |

CHESTER L. JUSTUS, *Primary Examiner.*

P. M. HINDERSTEIN, E. T. CHUNG,
*Assistant Examiners.*